Patented Dec. 4, 1934

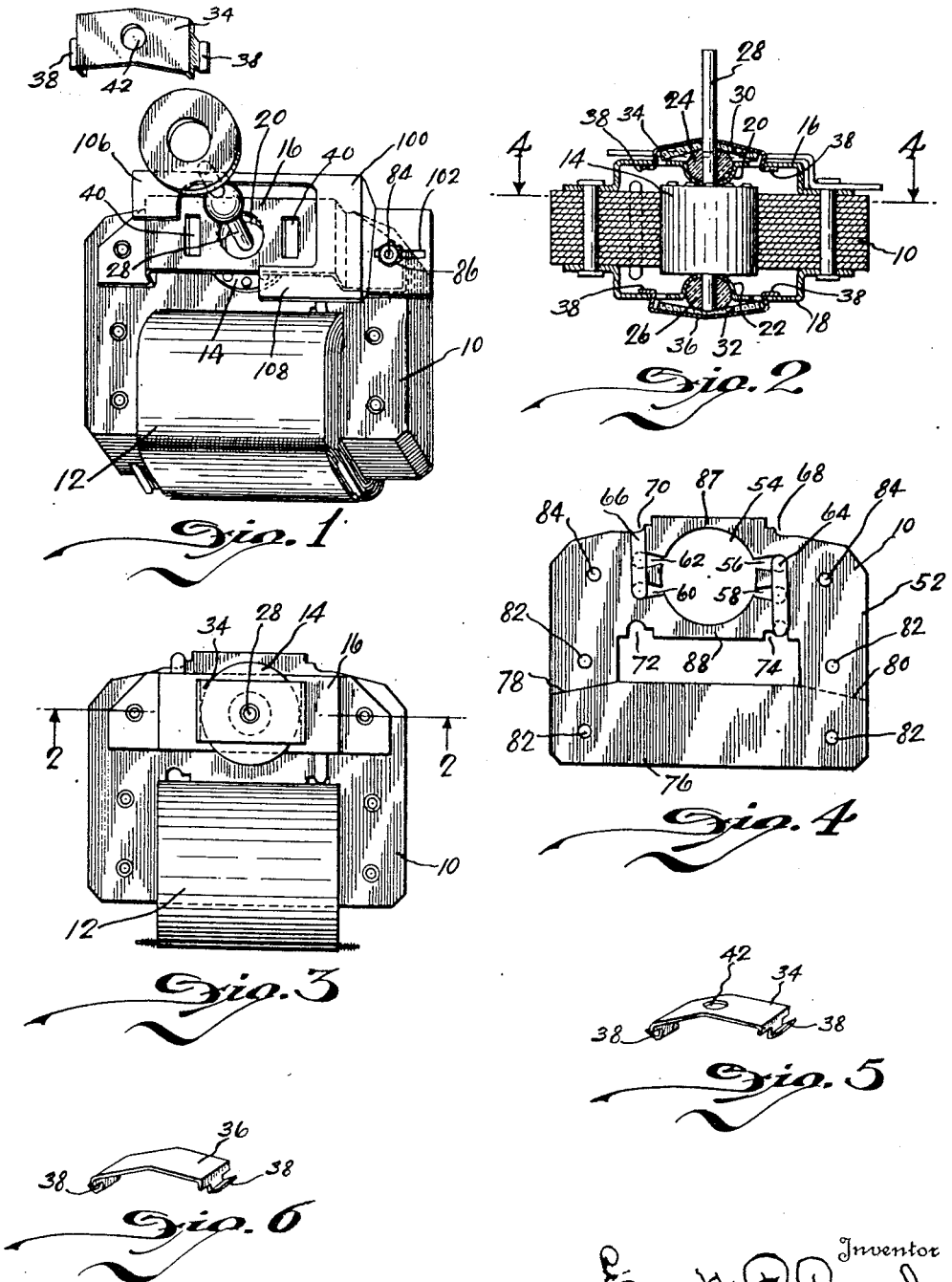

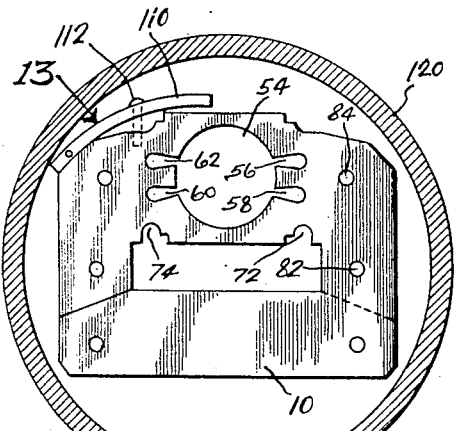
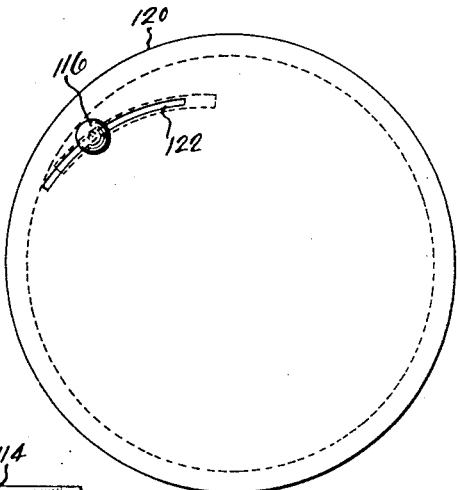
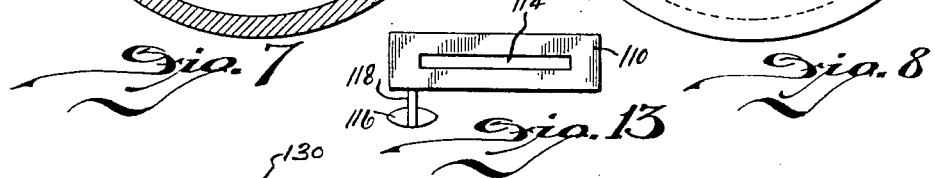
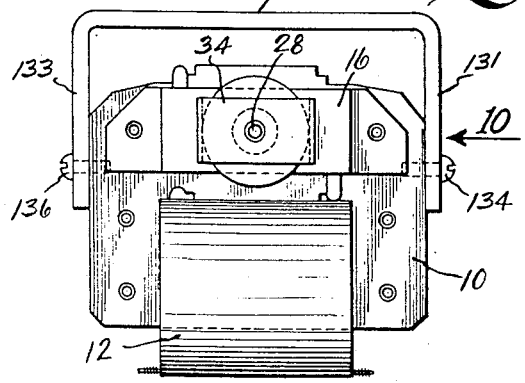
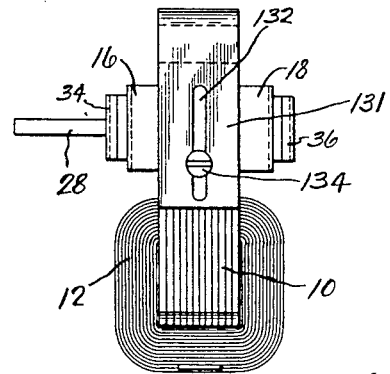
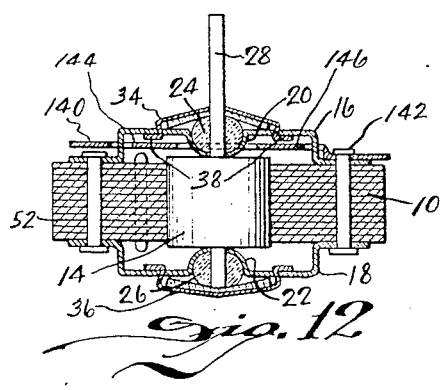
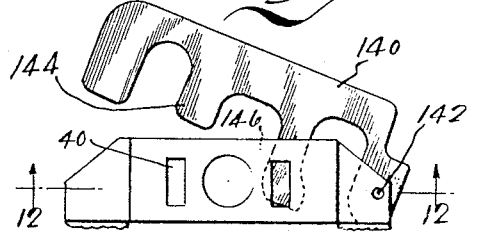

1,983,09

UNITED STATES PATENT OFFICE 1,983,091

ELECTRODYNAMIC MACHINE

Everett P. Larsh, Vandalia, Ohio, assignor to The Master Electric Company, Dayton, Ohio, a corporation of Ohio Application February 6, 1932, Serial No. 591,401

14 Claims. (Cl. 172—278)

This invention relates to an induction motor, and in more particular to the magnetic circuit therefor.

As is well known to those skilled in the art the speed of an induction motor depends upon numerous factors, such as frequency of the alternating current impressed across the terminals of the motor, the voltage, the number of poles, the percent of slippage, etc. From this it appears obvious that the speed of the motor may be changed by changing the frequency of the source of power or the voltage, each of which is impractical, by changing the number of poles which is prohibitive because of its cost and the intricate mechanism required, and finally by changing the percent of slippage. The percent of slippage may be changed by changing the load, by changing the rotor, by changing the air gap found between the rotor and the pole pieces, by changing the number of turns in the exciting field, and by any other means of varying the flux passing through the rotor. Each of the above may be accomplished without changing the voltage impressed upon the terminals of the motor.

An object of this invention is to change the speed of motor by changing the flux passing through the rotor thereby effecting a change in the percent of slippage. This has been accomplished by changing the effective reluctance of the magnetic circuit, which may be changed in numerous ways. In the preferred modification a magnetic member adjustable mounted on the stator or near the stator is provided to change the magnetic leakage so as to bypass a suitable portion of the flux thereby changing the useful flux passing through the rotor.

Another object of this invention is to provide a stator for an induction motor of the core type, having laminations symmetrically constructed so as to be reversible thereby reducing the cost of the motor and increasing its efficiency.

Further objects and advantages of the present invention will be apparent from the following description, reference being had to the accompanying drawings wherein a preferred embodiment of one form of the present invention is clearly shown.

In the drawings:

Fig. 1 discloses a perspective view of a preferred modification with the bearing members ready for assembly.

Fig. 2 discloses a longitudinal sectional view passing through the pole pieces taken substantially on line 2—2 of Fig. 3.

Fig. 3 discloses a plan view of the modification disclosed in Fig. 1.

Fig. 4 is section of the stator taken on the line 4—4 of Fig. 2.

Figs. 5 and 6 disclose the upper and lower bearing retaining members disclosed in Fig. 2.

Fig. 7 discloses another modification with the housing in sectioning.

Fig. 8 discloses the exterior of the housing showing a control knob.

Fig. 9 discloses another modification for by-passing a portion of the flux.

Fig. 10 discloses an end view looking in the direction of the arrow 10 in Fig. 9.

Fig. 11 discloses a fragmentary view of another modification having a pivotally mounted flux by-pass member.

Fig. 12 is a sectional view taken substantially on line 12—12 of Fig. 11.

Fig. 13 discloses the bridging member as seen in the direction of the arrow 13 in Fig. 7.

The induction motor includes a stator 10, having a winding 12 and a rotor 14 having its shaft 28 journaled in bearings 24 and 26 seated in hemi-spherical seats 20 and 22, located in the brackets 16 and 18. The bearings 24 and 26 are preferably made from a porous material so that the bearing surface may be lubricated from the felt or fibrous washers 30 and 32 mounted intermediate the bearings 24 and 26 and the bearing retaining members 34 and 36 as may best be seen in Fig. 2. The bearings 24 and 26 are held in the hemi-spherical seats 20 and 22 by the bearing retaining members 34 and 36 respectively, each of which are provided with ears or hooks 38 that pass through the rectangular apertures 40 in the brackets 16 and 18 so as to hook on the inside of the brackets.

This bearing assembly permits the removal of bearings 24 and 26 without detaching the brackets 16 and 18 from the stator 10 without the use of screws, nuts, or other fastening means independent of the retaining members. By saturating the felt washers 30 and 32 with suitable oil the bearings are kept lubricated. The bearings 24 and 26 that are housed or seated in the hemi-spherical recesses 20 and 22, are self-aligning, thereby reducing the initial cost of production. The bearing structure is not claimed in this application for the reason that this forms the subject matter of my co-pending application, Serial No. 591,402, filed February 6, 1932.

As may best be seen in Figs. 5 and 6 the retaining member 34 is provided with an apparatus 42 allowing the shaft 28 to pass thereto, whereas the retaining member 36 is not provided with an aperture so that the retaining member 36 functions as an end thrust member. This structure has been found to eliminate the use of end thrust collars on the shaft 28 when the rotor is used in driving a fan or any other mechanism that tends to bias the shaft in one direction.

The stator 10 is of the core type, as may best be seen in Fig. 4, assembled from a plurality of laminations as seen in Fig. 2. The individual laminations 52 may be stamped from a piece of sheet material so as to have a cylindrical recess 54 to accommodate the rotor, slots 56, 58, 60 and 62 symmetrically arranged with respect to the axis passing through the cylindrical aperture 54, and normal to the axis of the coil 17. The slots 56 and 60 as disclosed in Fig. 4 carries the shading coil 64 and 66, the function of which will appear more fully later. Semi-circular recesses or notches 68, 70, 72 and 74 have been provided in the contour of the blank to accommodate shading coils.

In order to insert the core 76 of the lamination 52 into the winding 12, the laminations 52 have been severed along the line 78. As is well known to those skilled in the art it is desirable to stack the laminations 52 so that a continuous air gap will not be formed in the stator 10 along the line 78. In order to do so, it is customary to sever or slit one lamination along the line 78 and to stack on top thereof another lamination severed along some other line. This has been done in the assembly of this stator by reversing every other lamination so the line of separation of the core 76 is found alternately at 78 and 80 as seen in Fig. 4. The symmetrical shape of the laminations permits this without a change in alternate blanks. After the laminations have been stacked with the core 76 passing through the coil 12 the laminations are clamped together by rivets 82 and by the rivets or screws 84 passing through the laminations and through the brackets 16 and 18. The laminations having the bridges, 87 and 88 extending from one pole to the other increases the strength of the stator surrounding the rotor. This increased strength permits the reduction of the air gap between the rotor and the stator. Besides this it greatly increases the area between the pole pieces and the rotor—for given size rotor thereby decreasing the flux density in the air gap without decreasing the useful flux passing through the rotor.

Whenever the coil 12 is excited, magnetic lines of force indicated by the dotted lines 90, pass through the stator 10. In conventional motors it is customary to interpose the armature 14 intermediate opposite faces of the poles. In the present modification there appears to be a continuous magnetic path or circuit through the core that does not pass through the armature 14. However, the currents generated in and carried by the shading rings 64 and 66, only two of which have been disclosed, deflect a portion of the flux so that there is a tendency for the flux to pass through the unshaded portion. The flux that does pass through the shaded portion has a lagging phase so as to provide a suitable starting torque as is well known to those skilled in the art. The magnitude of the starting torque is governed in part by the area of the core that is shaded, and by the size of its shading coils. Obviously the larger the shading coil the less will be the resistance and the larger the current flowing there-through. By properly selecting the size and the material of the shading coil, as is well known to those skilled in the art, a suitable starting torque may be provided. In some cases it may be desirable to use a plurality of shading coils for each pole either of the same size or of different sizes so as to provide progressive shading, as well known to those skilled in the art.

When the induction motor is used to propel a fan or any other device wherein it is desirable to change the speed, a speed change mechanism is required. In the modification disclosed in Fig. 1 this has been accomplished by providing a magnetic member 100, substantially Z-shaped in cross section as disclosed in Fig. 2, and adjustably mounted on the stator 10. The Z-shaped member 100 as provided with a slot 102, through which passes the fastening member 84 held in position by a nut 86. The Z-shaped member 100 is also provided with a pair of bridging members 106 and 108 that extend part way over the zone of practically no magnetic lines hereafter referred to as the magnetic phase-shifting zone or gap of the stator 10, which is found near the shading rings 64 and 66. The bridging members 106 and 108 are of unequal length for the reason that the greatest effect of each is produced by spanning the magnetic phase-shifting zone diametrically disposed about the rotor 14.

By adjusting the member 100 to the right or to the left as disclosed in Figs. 1 and 2, the amount of flux shunted through the bridging members 106 and 108 is either decreased or increased. Thus by adjusting member 100 the useful flux passing through the rotor 14 is changed thereby altering the speed thereof.

In Fig. 7 bridging member 110 is adjustably attached to the stator 10 by a pin 112 passing through a slot 114 as best seen in Fig. 13, disclosing member 110 as seen in the direction of the arrow 13 in Fig. 7. In order to expedite the adjustment of member 110 across the magnetic phase-shifting zone a knob 116 carried by the pin 118, attached to member 110 is located on the outside of the housing 120 as may best be seen in Fig. 8. The pin 118 passes along the slot 122 in the housing 120 as the knob 116 is moved along the slot 122, thereby causing member 110 to increase or decrease the amount of flux shunted around the magnetic phase-shifting zone so as to change the flux supplied to the rotor 14. This construction lends itself to the installation in motors mounted within the housing as is customary in the construction of fans and other electrical devices.

In Figs. 9 and 10 a U-shaped short circuiting flux member 130 of magnetic material is disclosed having slots 132 in the legs 131 and 133, through which extend screws 134 and 136 respectively, that adjustably attach the U-shaped member 130 to the stator 10. By advancing the U-shaped member 130 towards the stator 10 the reluctance through the U-shaped member is decreased as the effective distance is decreased. By so doing flux passing through the rotor 14 is varied thereby actually changing the speed of the rotor.

In the modification disclosed in Figs. 11 and 12 a flux by pass member 140 of magnetic material, pivoted at 142 passing underneath the bracket 16 tends to short circuit a portion of the flux in that the arms 144 and 146 pass over the magnetic phase-shifting zone of the stator thereby short circuiting a portion of the flux. By rotating member 140 in a counter clockwise direction as viewed in Fig. 11 the amount of flux short circuited is increased thereby decreasing the amount of flux passing through the rotor so as to decrease the speed thereof.

Instead of shunting a portion of the flux around the magnetic phase-shifting zone, it may be desirable to control the speed of the motor by shunting a portion of the main flux so as not to pass the shunted flux through the rotor. This is advantageous where a large starting torque is required.

Although a two-pole single phase induction motor has been disclosed, the invention is equally applicable to motors having more poles or to multiphase motors.

Likewise the principle disclosed may be used in any type of electro-magnetic device provided with an armature, either rotatably or otherwise movably mounted.

While the form of embodiment of the present invention as herein disclosed, constitutes a preferred form, it is to be understood that other forms might be adopted, all coming within the scope of the claims which follow.

What is claimed is as follows:

Having thus described my invention, I claim:

1. A speed changing mechanism for an induction motor having a stator provided with field coil, magnetic pole pieces, and a squirrel cage rotor disposed intermediate said pole pieces, said speed changing device including a magnetic U-shaped adjustable member bridging two of said pole pieces, the adjustment of said member changing the reluctance of the magnetic circuit thereby changing the flux passing through the rotor so as to vary the speed thereof.

2. An induction motor comprising in combination a core type stator, said stator having a plurality of pole pieces forming a cylindrical surface, a squirrel cage rotor mounted intermediate said faces, and means for changing the speed of said motor, said means including an adjustable U-shaped bridging member providing a flux path parallel to the path of the flux passing through the rotor, so that the flux linking the rotor changes as the U-shaped member is adjusted.

3. An induction motor, comprising in combination a stator having a plurality of concave pole pieces, a squirrel cage rotor mounted between the pole pieces, an adjustable magnetic bridging member pivotally attached to said stator, said bridging member mounted to swing across the electro-magnetic neutral gap intermediate adjacent pole pieces of opposite polarity so as to shunt a portion of the magnetic circuit thereby reducing the flux through said rotor as the flux shunted is increased.

4. An induction motor, comprising in combination a stator having a plurality of concave pole faces, said stator including phase shifting zones, a rotor mounted between said pole faces, an adjustable magnetic member having two branches, one of which extends partially across the magnetic phase-shifting zone between two of said poles, and another branch extending across another magnetic phase-shifting zone so as to by pass a portion of the flux through one branch and so as to by pass another portion of the flux through the other branch without passing said by passed flux through the rotor.

5. An induction motor comprising in combination a stator, having a plurality of pole pieces, a rotor, said stator having concave pole faces adjacent said rotor, and a speed control mechanism, including a bridging member adjustably attached to said stator, said bridging member extending from one pole to another pole so as to shunt a portion of the flux which is dependent upon the adjustment of the bridge member without changing the reluctance of the magnetic circuit through the rotor whereby the speed of the rotor is changed by adjusting said bridging member.

6. An electro-magnet device including an armature, a core type magnetic stator, an exciting coil linking said stator for energizing said armature, said stator being formed of a plurality of stacked laminations, said laminations having symmetrically arranged notches and slots so that the laminations are reversible, shading coils disposed in said notches and slots for shifting the phase of the flux linking said shading coils and adjustable means spanning the shading rings for by passing a portion of the flux around the armature so that only a portion of the flux passes through the armature.

7. An electro-magnetic device including an armature, a core type stator, a magnetic coil linking said stator, said armature being disposed in the magnetic circuit of said stator, said stator including symmetrically shaped stacked laminations, said laminations including symmetrically arranged semi-cylindrical notches in the outer and inner periphery and symmetrically arranged slots in the face of the stator so that as the laminations are reversed the notches and slots register, a shading coil located in a notch and in a slot, said shading coil causing lag in the flux passing through said armature.

8. An alternating current electro-magnetic device including an armature, a core type stator, a coil linking said stator for energizing said armature, said stator including laminations having symmetrically arranged notches and slots, the laminations being slitted along a line on one side so that the laminations are alternately stacked, said slits are disposed alternately on opposite sides and the notches and slots register, and shading rings disposed in some of the notches and slots for shifting the flux linking the shading rings.

9. In a bi-polar shading coil type induction type motor, said motor having a squirrel cage rotor, a speed control mechanism including a magnetic member adjustably mounted, said member extending from one pole piece to the other forming a magnetic by-pass circuit in parallel with the rotor so that as said member is adjusted the flux linking the rotor is changed, without varying the reluctance of the magnetic circuit of the rotor but varying the operating characteristics of the motor.

10. In an induction motor having a stator of the core type provided with shading rings, and a squirrel cage rotor, a speed control mechanism including an adjustable bridge extending from pole piece to pole piece and spanning at least one shading coil so that as the bridge is adjusted the performance of the motor is altered.

11. A stator lamina for an induction motor of the shading ring type comprising a symmetrical plate having therein an opening for a field coil and an opening for a rotor and having multiple seats to receive shading rings, the longitudinal axis of said seats being offset with respect to the axis of the rotor, said openings and seats being symmetrical in shape and disposition in the plate whereby the outline, openings and seats of two such plates will register in alternate positions of reversal.

12. An induction motor of the shading ring type including a stator having pole pieces, a rotor interposed between the pole pieces, a field coil on the stator, a pair of spaced like slots in each pole piece, and shading rings engaged in non-corresponding slots of each pair and extending thence about the exterior of the pole pieces, the remaining slots of each pair being vacant.

13. An induction motor of the shading ring type including a stator having pole pieces, a rotor interposed between the pole pieces, a field coil on the stator, a pair of spaced like slots in each pole piece disposed in equi spaced relation with the margins of such pole pieces the corresponding slots of the respective pairs being of equal size, and shading rings engaged in the non-corresponding slots of each pair, the said shading ring slots occupying identical positions relative to the stator upon reversal thereof.

14. A stator lamina for an induction motor of the shading ring type comprising a plate of generally rectangular form having therein an elongated opening of symmetrical form and a circular opening, and having at least two slots intersecting each of the opposite sides of the circular opening, said openings and slots being symmetrically disposed relative to the plate whereby two of said plates may be assembled with their margins, openings and slots in registry in either position of reversal of the respective plates.

EVERETT P. LARSH.